3,027,706
TURBOCHARGED V-TYPE ENGINE
William L. Sprick, Richwoods Township, Peoria County,
Ill., assignor to Caterpillar Tractor Co., Peoria, Ill., a
corporation of California
Filed Mar. 24, 1961, Ser. No. 98,040
4 Claims. (Cl. 60—13)

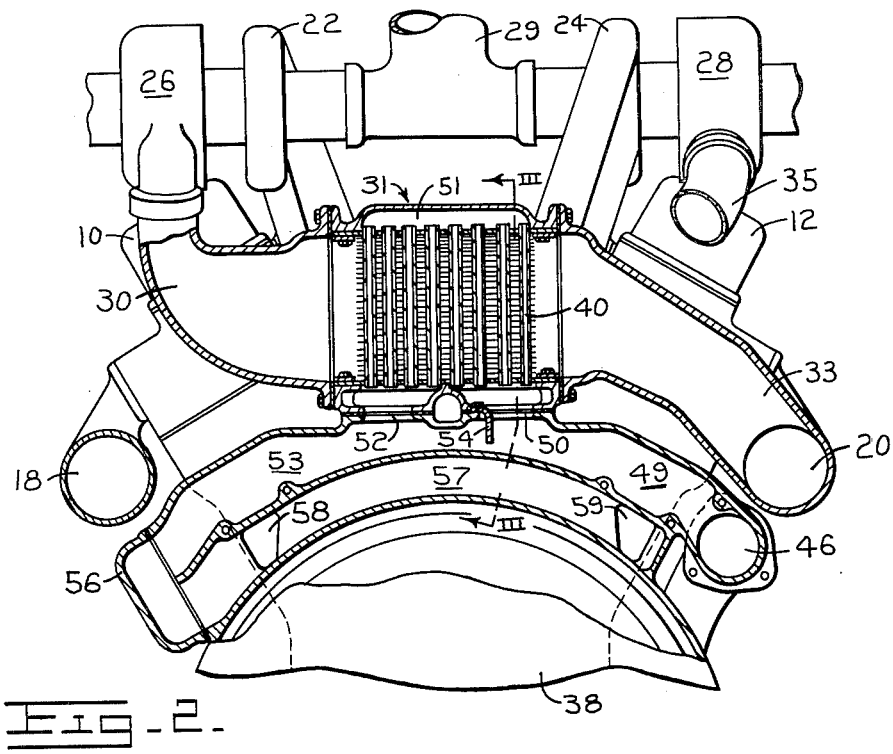
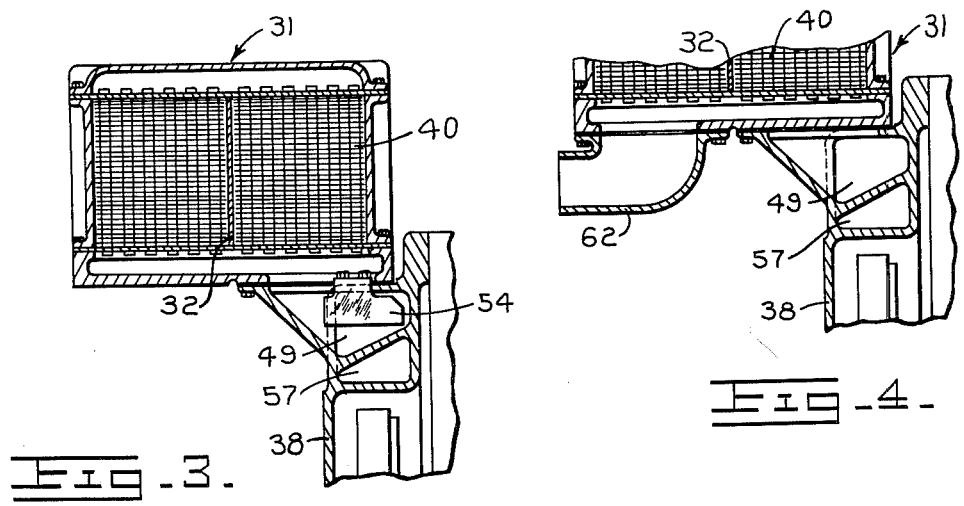

This invention relates to turbocharged internal combustion engines and particularly to the construction and arrangement of the components of a turbocharging system on a V-type engine.

The basic components of an engine turbocharger are a gas turbine driven by engine exhaust and a compressor driven by the turbine for compressing and directing atmospheric air under pressure to the engine intake manifold. Advantages have been recognized in V-type engines in the provision of a separate turbocharger for each of the two banks of cylinders and further advantages are known to result from the use of a cross-over system where the left bank turbocharger charges the right bank and vice versa. This complicates the design of the system and creates space problems usually greatly enlarging the overall size of the engine.

Still further complexities and design problems arise from the fact that after coolers must be employed to obtain a high degree of efficiency from turbochargers, an after cooler being a heat exchanger to reduce the temperature of air leaving the compressors and thus to reduce its volume and increase the quantity of useful oxygen per unit of volume.

It is the object of the present invention to provide a V-type engine having a cross-over type and after cooled turbocharging system of compact and efficient design.

A further object of the invention is to provide such an engine with an after cooler unit conveniently positioned and designed for service of two turbocharging units utilizing engine coolant as the cooling medium, or alternately, for service with another source of coolant such for example as raw water as is common practice in marine installations by a simple change in installation procedure.

Further and more specific objects and advantages of the invention and the manner in which it is carried into practice are made apparent in the following specification wherein reference is made to the accompanying drawings.

In the drawings:

FIG. 2 is a fragmentary view in rear elevation of a portion of the engine shown in FIG. 1 with parts illustrated in section;

FIG. 3 is a fragmentary sectional view taken on the line III—III of FIG. 2; and

FIG. 4 is a fragmentary section similar to FIG. 3 showing the after cooler unit assembled in an alternate position.

Figure 1:
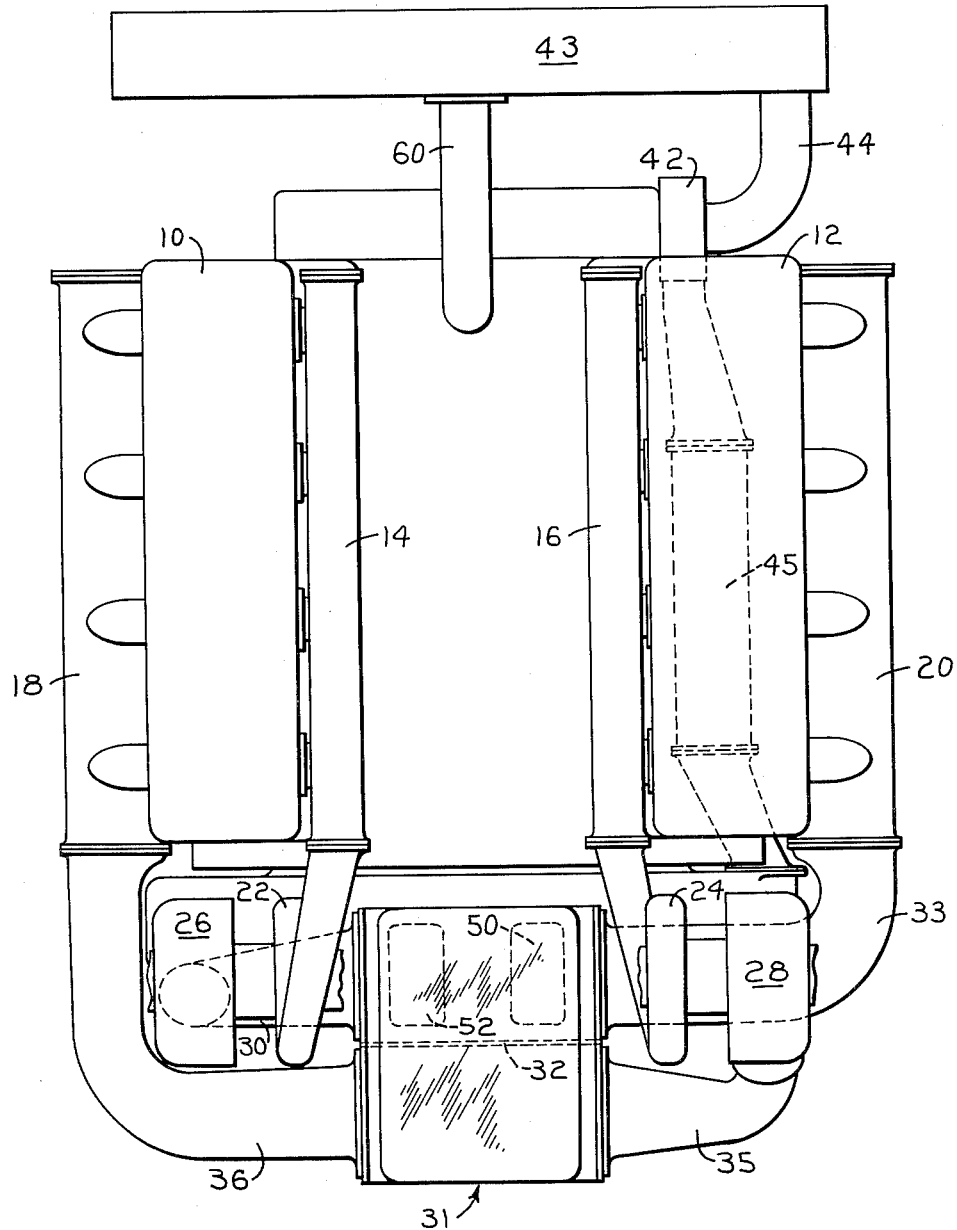
FIG. 1 is a schematic plan view of an engine with a turbocharging system embodying the present invention.

The turbocharging components of the engine will first be described by reference to FIGS. 1 and 2 wherein an engine of the V-type is illustrated as having a left bank of cylinders 10 and a right bank 12. These banks of cylinders have exhaust manifolds 14 and 16, respectively, and intake manifolds 18 and 20, respectively. Exhaust gases under pressure are directed from the exhaust manifolds to turbines 22 and 24 which are rotated by them and which in turn, through the usual mechanical drive (not shown), effect rotation of compressors 26 and 28. The exhaust from the turbines 22 and 24 may flow into a common stack 29 as shown in FIG. 2 for discharge into the atmosphere. The compressors 26 and 28 receive and compress atmospheric air and the compressor 26 of the left bank 10 discharges through a conduit 30, the forward half of a heat exchanger generally indicated at 31 which is divided into rear and forward compartments by a wall 32 (see also FIG. 3) and thence through a conduit 33 to the intake manifold 20 of the right cylinder bank 12. Similarly the compressor 28 of the right cylinder bank discharges through a conduit 35 (see FIG. 1), thence through the rear compartment of the heat exchanger 31 and a conduit 36 to the intake manifold of the left cylinder bank 10. Space is conserved by arranging the cross-over conduit systems just described behind the cylinder banks and just above the flywheel of the engine disposed in the flywheel housing, a portion of which is shown at 38 in FIG. 2.

The heat exchanger 31 comprises banks of vertically disposed finned tubes, as shown at 40 in FIGS. 2 and 3, and the air to be cooled from the compressors 26 and 28 is passed in the usual manner over the exterior surfaces of these tubes while a coolant is directed through the tubes. In cases where engine coolant from the engine cooling system is employed in the heat exchanger or after cooler, the conventional engine pump indicated at 42 in FIG. 1 withdraws coolant from the engine radiator 43 through a conduit 44 and discharges the coolant, in this particular case through an oil cooler indicated in dotted lines at 45, and thence rearwardly through an outlet shown at 46 in FIG. 2 and into passageways, which in the interest of saving space and producing a compact design, are cast integrally with the upper portion of the flywheel housing 38 as shown in FIGS. 2, 3 and 4. A first passageway 49 directs coolant into an inlet opening 50 in the bottom of the after cooler unit, thence upwardly through the tubes on one side thereof into a chamber 51 at the top of the unit and downwardly through the tubes on the opposite side thereof to be discharged through an outlet port 52 and into a second passageway 53. A baffle 54 between the passageways 49 and 53 is designed to compel an adequate quantity of coolant to pass through the after cooler, the remaining coolant flows directly into the passageway 53. Coolant leaving the passageway 53 is reversed in direction by an end cover plate 56 which directs it into a third passageway 57 from which it flows outwardly in a forward direction through an outlet 58 to the left cylinder bank and a similar outlet 59 to the right cylinder bank so that it flows forwardly through the banks in conventional manner for performing its usual cooling function in the engine. This coolant is exhausted from the forward portion of the engine as through a conduit 60 shown in FIG. 1 to return to the radiator 43 and complete the cycle.

In marine or other installations where a separate source of coolant such as raw water is available for use in the after cooler, the same after cooler unit 31 is installed in a reversed position which is shown in FIG. 4 instead of the position previously described as shown in FIG. 3. All of the connections for the compressed air conduits 30, 33, 35 and 36 as shown in FIG. 1 are identical in size and shape so that their relationship with the after cooler unit may remain the same. However, the inlet and outlet port 50 and 52 on the bottom of the after cooling unit are disposed rearwardly rather than forwardly thereof and fittings, one of which is illustrated at 62 in FIG. 4, are adapted to the inlet and outlet openings for the reception and discharge of a coolant from an external source with the aid of any conventional circulating means such as a pump or the like, not shown. In this alternate position of the after cooler, the imperforate portion of the bottom thereof closes the openings in the passageways 49 and 53 which otherwise register with the inlet and outlet openings in the after cooler as shown in FIG. 4. The baffle 54 is also removed and the engine coolant from whatever source it may be derived circulates in the manner previously described with the exception that it does not pass through the after cooler.

I claim:

1. A turbocharged V-type engine having two cylinder banks comprising a turbocharger unit driven by the exhaust from each bank to direct air to the intake of the opposite bank through conduit systems which cross each other at one end of the engine, and a single after cooler unit interposed in both conduit systems to cool said air.

2. A turbocharged V-type engine having two cylinder banks comprising a turbocharger unit driven by the exhaust from each bank to direct air to the intake of the opposite bank through conduit systems which cross each other at one end of the engine, and a single after cooler unit interposed in both conduit systems to cool said air, said after cooler unit having inlet and outlet openings to permit the passage of a cooling fluid therethrough, and means to circulate engine coolant through said openings and the after cooler.

3. A turbocharged V-type engine having two cylinder banks comprising a turbocharger unit driven by the exhaust from each bank to direct air to the intake of the opposite bank through conduit systems which cross each other at one end of the engine, and a single after cooler unit interposed in both conduit systems to cool said air, said after cooler unit having inlet and outlet openings to permit the passage of a cooling fluid therethrough, and means to circulate engine coolant through said openings and the after cooler, said after cooler being disposed above the engine flywheel housing and said means to circulate comprising passageways formed by walls cast integrally with the flywheel housing and having openings registering with the inlet and outlet openings in the after cooler and openings communicating with the engine coolant system.

4. A turbocharged V-type engine having two cylinder banks comprising a turbocharger unit driven by the exhaust from each bank to direct air to the intake of the opposite bank through conduit systems which cross each other at one end of the engine, and a single after cooler unit interposed in both conduit systems to cool said air, said after cooler unit having inlet and outlet openings to permit the passage of a cooling fluid therethrough, and means to circulate engine coolant through said openings and the after cooler, said after cooler being disposed above the engine flywheel housing and said means to circulate comprising passageways formed by walls cast integrally with the flywheel housing and having openings registering with the inlet and outlet openings in the after cooler and openings communicating with the engine coolant system, said after cooler being of symmetrical design but having its openings adjacent a forward wall thereof whereby it may be reversed in position to expose said openings for connection with a separate source of cooling fluid.

No references cited.